No. 814,653. PATENTED MAR. 6, 1906.
J. A. HEALEY.
EDUCATIONAL APPLIANCE.
APPLICATION FILED FEB. 24, 1905.
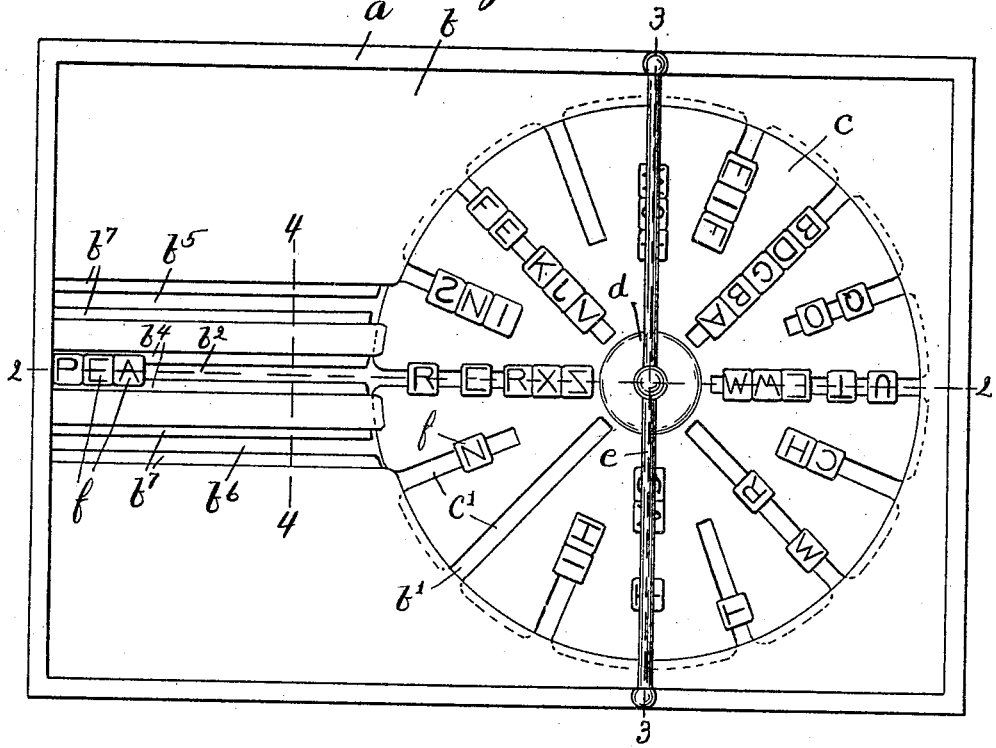
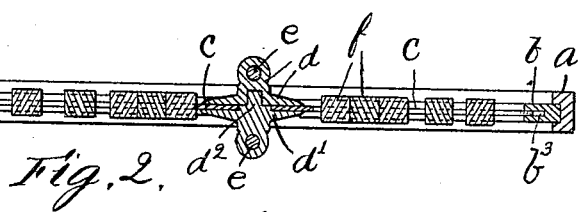
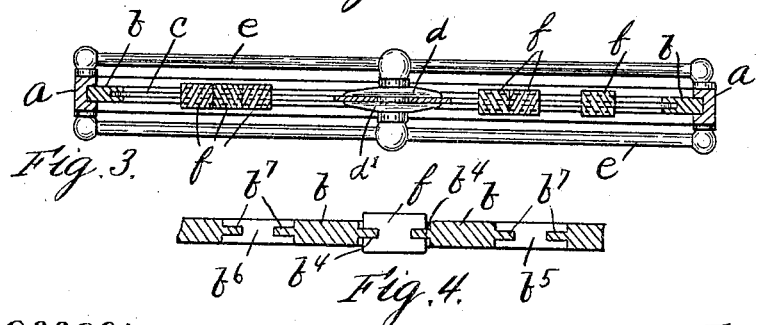
Witnesses:
H. B. Davis.
Cynthia Doyle
Inventor:
James A. Healey
By Noyes & Noyes
Attys

UNITED STATES PATENT OFFICE.

JAMES A. HEALEY, OF WAKEFIELD, MASSACHUSETTS, ASSIGNOR TO AMERICAN TOY MANUFACTURING COMPANY, A CORPORATION OF MAINE.

EDUCATIONAL APPLIANCE.

No. 814,653.  Specification of Letters Patent.  Patented March 6, 1906.

Application filed February 24, 1905. Serial No. 247,102.

*To all whom it may concern:*

Be it known that I, JAMES A. HEALEY, of Wakefield, county of Middlesex, State of Massachusetts, have invented an Improvement in Educational Appliances, of which the following description, in connection with the accompanying drawings, is a specification, like characters on the drawings representing like parts.

This invention relates to that class of educational appliances in which letter or figure bearing blocks are slidably supported in a frame or holder and are adapted to be moved into a predetermined space to form words or combinations of figures.

My invention has for its object to provide a device of the above-named character which is adapted to hold a large number of letter-bearing blocks within a comparatively small area and with all the letters visible at one time; to provide a construction which may be manufactured at small expense and is adapted to be operated more easily and quickly and which possesses various other features of advantage as an educational appliance and an amusement apparatus, as will hereinafter appear. I accomplish these objects by providing a wheel bearing a number of radially-extending guideways which are open at the periphery thereof, in combination with a board provided with a receiving-guideway at one side of the wheel, with the end of which the ends of the radial guideways are adapted to be brought into register.

For a more complete understanding of my invention reference is made to the accompanying drawings, in which—

Figure 1 is a plan view of an appliance made according to my invention. Fig. 2 is a longitudinal section on line 2 2 of Fig. 1. Fig. 3 is a cross-section on line 3 3 of Fig. 1. Fig. 4 is a sectional view on the line 4 4 of Fig. 1.

The device comprises a rectangular frame $a$, which supports a board or plate $b$. Said board $b$ is provided with a circular aperture $b'$ in one end thereof, the diameter of said aperture being not much greater than half the length of the board. A letter-block-carrying wheel or holder $c$ is journaled to rotate in the middle plane of the board between two plates $d\ d'$, one of the plates $d'$ having a centrally-disposed lug $d^2$, which passes through said wheel and enters a recess in plate $d$, said lug constituting a central bearing for the wheel. The said plates are respectively supported by a pair of cross-bars $e\ e$, secured at their ends to the frame $a$. The wheel $c$ may be made of thin but stiff sheet metal and is provided with a series of radial slots $c'$, which may be of various lengths and arranged with as much frequency as is feasible without weakening the wheel to too great an extent.

A slot $b^2$ is formed in the board $b$, said slot opening into the circular aperture $b'$ and extending parallel to the longer sides of the frame, with its central longitudinal line coincident with a line which intersects the axis of the wheel at right angles. Ribs $b^4$ are formed at each side of said slot $b^2$, said ribs being of the same thickness as the wheel $c$ and arranged in the plane thereof, the distance between their edges being the same as the width of the wheel-slots $c'$, so that the sides of the wheel-slots $c'$ may be moved in alinement with the edges of said ribs $b^4$. Slots $b^5$ and $b^6$ may also be formed in the board $b$ parallel to and at opposite sides of slot $b^2$, guiding-ribs $b^7$ being also provided at each side of said slots $b^5$ and $b^6$ and said slots opening into the circular aperture $b'$, so that the sides of slots $c'$ of the wheel may register with the ends of said ribs $b^7$. The board $b$ is also provided with an annular groove or recess $b^3$, which leads to the circular aperture $b'$ in the plane of the wheel $c$ and receives the edge portion of the wheel, thereby constituting a guide and a support for the peripheral portion of the wheel and closing completely the space between the wheel and board. Blocks $f$, having letters, figures, or other characters formed on their opposite faces, are slidably mounted in slots $c'$, said blocks being provided with grooves $f'$ in the middle and at each side thereof, adapted to receive the edge portions of the wheel at the sides of the slots $c'$, and also the ribs $b^4$, so that they may slide freely in the guideways thus provided.

In using the device the wheel is rotated so that one of its slots $c'$ registers at its outer end with the adjacent end of the receiving-slot $b^2$ or one of the slots $b^5$ and $b^6$, and then one of the blocks in the slot $c'$ is slid therefrom into such slot. This operation is continued, the blocks being moved from the slots of the wheel to the slot of the board until a number of blocks are so arranged in the receiving-slot that the letters which they bear spell the word which was to be formed. It frequently happens that before a word can be formed some of the blocks must be transferred from one wheel-slot to another in order that a certain block may be moved into the desired position, and this is accomplished by simply moving the blocks into a receiving-slot, turning the wheel to bring another of its slots into register, and then moving them back into such wheel-slot. A large variety of moves are thus usually involved in forming a word, requiring enough planning or forethought to interest a child, and making the device serve as a simple puzzle, as well as an educational appliance. The words may be formed on either side of the board, or one side of the blocks may be provided with figures and arithmetical signs and the other side with letters. The main purpose of the plurality of receiving-slots is to enable arithmetical problems to be performed with the figure-bearing blocks.

Having thus described my invention, what I claim as new, and desire to secure by Letters Patent, is—

An educational appliance comprising a plate or body having a circular aperture therethrough and having a block-receiving slot leading to said aperture and an annular guideway-slot leading from said aperture in the plane of the plate, supports connected to said plate and extending over said aperture, a flat disk located in said aperture journaled on said supports and having a projecting tongue at its edge portion located in said guiding-slot, said disk also having a series of block-holding slots leading to its periphery and adapted to register with the end of said receiving-slot, and a series of blocks slidably mounted in said receiving and holding slots, substantially as described.

In testimony whereof I have signed my name to this specification in the presence of two subscribing witnesses.

JAMES A. HEALEY.

Witnesses:
 L. H. HARRIMAN,
 H. B. DAVIS.